(12) United States Patent
Nocera et al.

(10) Patent No.: US 9,518,143 B2
(45) Date of Patent: Dec. 13, 2016

(54) "NO-BAKE" FOUNDRY MIX WITH EXTENDED WORK TIME

(71) Applicant: ASK CHEMICALS LP, Wilmington, DE (US)

(72) Inventors: Michael R. Nocera, Dublin, OH (US); Gregory P. Sturtz, Dublin, OH (US); Jörg Kroker, Powell, OH (US)

(73) Assignee: ASK Chemicals, L.P., Wilmington, DE (US)

( * ) Notice: Subject to any disclaimer, the term of this patent is extended or adjusted under 35 U.S.C. 154(b) by 39 days.

(21) Appl. No.: 14/406,092

(22) PCT Filed: Jun. 7, 2013

(86) PCT No.: PCT/US2013/044650
§ 371 (c)(1),
(2) Date: Dec. 5, 2014

(87) PCT Pub. No.: WO2013/184996
PCT Pub. Date: Dec. 12, 2013

(65) Prior Publication Data
US 2015/0114589 A1    Apr. 30, 2015

Related U.S. Application Data

(60) Provisional application No. 61/657,212, filed on Jun. 8, 2012.

(51) Int. Cl.
C08G 18/20    (2006.01)
B22C 1/22    (2006.01)
C08G 18/00    (2006.01)
C08G 18/28    (2006.01)
C08G 18/72    (2006.01)

(52) U.S. Cl.
CPC ............. C08G 18/2018 (2013.01); B22C 1/22 (2013.01); B22C 1/2273 (2013.01); C08G 18/00 (2013.01); C08G 18/28 (2013.01); C08G 18/72 (2013.01)

(58) Field of Classification Search
CPC .......................... C08G 18/2018; B22C 1/2273
See application file for complete search history.

(56) References Cited

U.S. PATENT DOCUMENTS 3,072,614 A * 1/1963 Bolton ............... C08G 18/3221
528/296
3,485,797 A 12/1969 Robins
3,676,392 A 7/1972 Robins
4,179,427 A 12/1979 Gardikes
4,370,463 A 1/1983 Schafer
4,452,299 A 6/1984 Gruber
4,692,479 A 9/1987 Schneider
5,616,631 A 4/1997 Kiuchi
5,698,613 A 12/1997 Jhaveri
6,017,978 A 1/2000 Chen
6,291,550 B1 9/2001 Chen
6,391,942 B1 5/2002 Chang
6,479,567 B1 11/2002 Chang
6,559,203 B2 5/2003 Hutchings
6,602,931 B2 8/2003 Chen
6,664,310 B2 12/2003 Chen
7,119,131 B2 * 10/2006 Marth ...................... B22C 1/22
523/142
7,125,914 B2 10/2006 Chang
7,984,750 B2 7/2011 Pederson
8,815,976 B2 8/2014 Thiel
2005/0004257 A1 1/2005 Gernon
2005/0009950 A1 1/2005 Dando
2011/0005702 A1 * 1/2011 Priebe ................... B22C 1/2273
164/47
2011/0129387 A1 * 6/2011 Stancliffe .............. B22C 1/2253
420/591
2013/0248138 A1 9/2013 Cornelissen

OTHER PUBLICATIONS

Ireland, E, "New Horizon in Nobake Binder Technology", AFS Transactions 02-025, Jan. 1, 2002 (XP009172007).
Burditt, "Mold and Core Binders Keep Pace with Industry Demands", Modern Casting vol. 78, No. 6, pp. 20-24, American Foundry Society,Schaumberg, IL, Jun. 1, 1988.

* cited by examiner

Primary Examiner — Vickey Nerangis
(74) Attorney, Agent, or Firm — Standley Law Group LLP

(57) ABSTRACT

A "no-bake" process allows the forming of larger metal castings, by providing longer work times, in the range of about 45 to about 60 minutes. This is achieved using a liquid curing catalyst that is a pyridine, substituted at the second or third position with a moiety having a molecular weight in the range of about 30 to about 100 mwu. Examples of the liquid curing catalyst include 2-ethanolpyridine, 3-chloropyridine and 2-methoxypyridine. When combined with a two-part polyurethane binder precursor and a foundry aggregate, the liquid curing catalyst provides not only the longer work time, but also a strip time that is less than about 167% of the work time, as measured from the point of activating the polyurethane precursors by mixing them in the presence of the curing catalyst.

8 Claims, No Drawings

"NO-BAKE" FOUNDRY MIX WITH EXTENDED WORK TIME

CROSS-REFERENCE TO RELATED APPLICATIONS

This application is a non-provisional application that claims benefit of priority to U.S. provisional application 61/657,212, filed 8 Jun. 2012, which is incorporated by reference as if fully recited herein.

TECHNICAL FIELD

This disclosure relates to a foundry mix used for casting metal parts, using molds and cores formed using a "no-bake" process. More particularly, it relates to a foundry mix containing an appropriate foundry aggregate and two polyurethane binder precursors. A liquid catalyst is used to cure the polyurethane formed from mixing the precursors. The preferred catalysts provide a "strip time" in excess of 45 minutes and a ratio of "work time" to strip time that is greater than about 0.6 and preferably is close to 1.0.

BACKGROUND

Molds and cores used in the casting of metal articles can be made from a foundry aggregate and a foundry binder. Several processes are used for this.

In the "no-bake" process, a foundry mix is prepared by mixing an appropriate aggregate with the binder and a curing catalyst. After compacting the foundry mix into a pattern, the curing of the foundry mix provides a foundry shape useful as a mold or core.

In the "cold box" process, a foundry mix is prepared by mixing an appropriate aggregate with a binder. After forcing the foundry mix into a pattern, a catalyst vapor is passed through the foundry mix, causing it to cure and provide a foundry shape useful as a mold or core.

In yet a further process, the foundry mix is prepared by mixing the aggregate with a heat reactive binder and catalyst. The foundry mix is shaped by compacting it into a heated pattern that causes the foundry mix to cure, providing a foundry shape useful as a mold or core.

Focusing on the "no-bake" processes, then, some widely used binders in the foundry industry for the "no-bake" process include phenolic urethane no-bake binders, ester-cured phenolic no-bake binders and furfuryl alcohol acid curing no-bake binders.

Phenolic-urethane polymer systems are not used only for foundry binder applications. For example, very similar polymer systems are used for polyurethane foams. Although it may be expected that the catalysts and other additives used with one of the three processes (no-bake, cold box and foam) may inform as to the others, this is simply not correct and the prior art, specifically, published U.S. application 2005/0004257 to Gernon states that polyurethane foam systems are vastly different from sand binding polyurethane systems.

The assignee of the present invention has been significantly involved in providing foundry binders for over forty years. Some representative US patents and published applications include U.S. Pat. Nos. 3,485,797 and 3,676,392 to Robins, U.S. Pat. Nos. 6,391,942, 6,479,567 and 7,125,914 to Chang, U.S. Pat. No. 6,559,203 to Hutchings, U.S. Pat. No. 6,602,931 to Chen and U.S. published application U.S. 2005/0009950 to Dando.

Several variables have been considered when formulating binder packages. For example, U.S. Pat. No. 5,616,631, to Kiuchi, teaches that prior no-bake binders have tended to have low curing rates and low initial strength. A long time is needed for the binder to set up sufficiently to allow the cured mold to be removed from the pattern, which results in poor utilization of the pattern. In the terminology of the present specification, the time required to allow the cured mold to be removed from the pattern issue is referred to generally as the "strip time." More rigorously, and for the experimental results presented, strip time is the time elapsed between mixing the binder components and the sand and placing the sand mix in a pattern, and when the foundry shape formed attains a level of 90 on the Green Hardness "B" scale, using the gauge sold by Harry W. Dietert Co, of Detroit, Minn., as is taught by the commonly-owned Chen '602 patent. Kiuchi '631 teaches that it is a desired result to increase the initial strength and to keep the strip time short. The initial strength is measured in terms of tensile strength.

Another term used in the prior art and in this specification is "work time." In this specification, the rigorous definition of work time is the time elapsed between mixing the binder components and the sand and placing the sand mix in a pattern, and when the foundry shape formed attains a level of 60 on the Green Hardness "B" scale, again using the gauge from Dietert. In terms more applicable to the foundry, the "work time" defines the approximate time during which the sand mix can be effectively worked in forming the mold. The difference between strip time and work time is, therefore, an amount of dead time during which the mold being formed cannot be worked upon, but cannot yet be removed from the pattern. The ratio of work time to strip time ("W/S") expresses this concept in a dimensionless manner, and ranges (at least in theory) from 0 to 1.

Ultimately, designers of foundry binder systems have the objective to providing a binder system that will use the heat from the poured molten metal to decompose the binder once a solid skin has been formed on the metal in the mold that reproduces the shape of the mold core. This decomposition allows the sand and/or other aggregate to be readily recovered and reused. As taught by U.S. Pat. No. 7,984,750, to Pederson, this need to decompose the binder is challenged when the mold is used with a metal poured at a temperature that is lower than the approximately 1000° C. at which cast iron is poured. Aluminum and magnesium are examples of such metals.

Almost as important as the ability to decompose the binder is to provide a binder that is environmentally acceptable. Because of the exposure of workers to the foundry mix both before casting and after, issues such as toxicity and odor must be considered.

When the metal part being cast is small, the binders known in the art perform the required job at least adequately and many perform excellently. When a larger part is to be cast, the time required to build up the mold is large enough that more time is needed. The prior art has tended to teach quicker cure, not slower. Even in Hutchings '203, where the problem is at least recognized, the ratio of work time to strip time is lower than 0.5. In another reference, U.S. Pat. No. 6,291,550 to Chen, which is commonly-owned, the ratio of work time to strip time is higher than 0.5, but the work times are so short that the system taught there is not practically used for a larger part, where a strip time of at least 45 minutes is needed. The preferred catalyst in Chen '550 is a tertiary amine, particularly, tris(3-dimethylamino) propylamine (CAS 33329-35-0).

It is therefore an object of this invention to provide an improved binder system in which a work time of at least 45 to 60 minutes is provided and a ratio of work time to strip time of at least about 0.6 is provided.

SUMMARY

This and other objects are met by a binder composition for a foundry mix, the foundry mix and a method of using the foundry mix.

The binder composition comprises a polyurethane binder precursor, provided in two parts, and a liquid curing catalyst. The first part of the binder precursor comprises a polyol component; the second part comprises a polyisocyanate component. The curing catalyst is provided in a liquid form and may be provided in a suitable solvent. The liquid curing catalyst is particularly selected to provide a work time in the range of about 45 to about 60 minutes after being mixed with the polyurethane binder precursors. The liquid curing catalyst should also provide a strip time that is less than about 167% of the work time, as measured from the same starting point, that is, when the liquid curing catalyst and both parts of the polyurethane binder precursor are mixed.

To prevent the curing of the binder precursors, the liquid curing catalyst is kept separate from at least the second part of the polyurethane binder precursor until use.

Typically, the liquid curing catalyst is present in the range of about 5 to 7 weight percent based on the weight of the first part of the polyurethane binder component.

The liquid curing catalyst will typically comprise a pyridine, substituted at the second or third position with a moiety having a molecular weight in the range of about 30 to about 100 molecular weight units ("mwu"). Specific examples of the liquid curing catalyst are 2-ethanolpyridine (CAS 103-74-2), 3-chloropyridine (CAS 626-60-8) and 2-methoxypyridine (CAS 1628-89-3). When using these compounds, the liquid curing catalyst may also comprises an aromatic hydrocarbon liquid in which the substituted pyridine is soluble, especially an aromatic hydrocarbon liquid in an amount of about 20 weight percent.

The foundry mix that meets the objects of the invention is provided by mixing the binder composition with an appropriate amount of a foundry aggregate. In such a foundry mix, and upon mixing the two parts of the polyurethane binder precursor, the liquid curing catalyst and the foundry aggregate, the result will be a foundry mix characterized by a work time in the range of 45 to 60 minutes for forming a foundry shape in a pattern, and a strip time for removing the formed and cured foundry shape from the pattern, where a ratio of the work time to the strip time is in the range of about 0.6 to 1.0.

The "no-bake" process for forming a foundry shape as defined by the invention comprises three steps. In the first step, a curing property of a foundry mix is activated by mixing the two parts of the polyurethane binder precursor with the liquid curing catalyst and the foundry aggregate. In the second step, the activated foundry mix is mixed in a pattern to form a foundry shape. In this step, the curing rate of the foundry mix allows the activated foundry mix to be worked for a time in the range of 45 to 60 minutes after the activating step has been performed. In the third step, the formed foundry shape is stripped from the pattern once the formed foundry shape is sufficiently cured to be handleable. In this step, the curing rate of the foundry mix is sufficient to allow the stripping to occur at a strip time that is less than about 167% of the work time, as measured from the activating step.

DETAILED DESCRIPTION

As a benchmark against which experimental results can be compared, a commercially-available no-bake foundry binder was selected. The foundry binder used was PEP SET™ I 1670/II X-2000, commercially available from ASK Chemicals LP. The selected foundry binder had two parts, with Part I comprising a polyol component and part II comprising a polyisocyanate component. The liquid catalyst selected for use in the control was 4-(3-phenylpropyl)pyridine ("4-PPP") (CAS 2057-49-0). This catalyst is considered a "slow" catalyst in terms of strip time at standard testing conditions.

In the experimental protocol, test cores were prepared. The Part I and the catalyst being tested were mixed with WEDRON 540 silica sand. Then, the Part II was added. The weight ratio of Part I to Part II was 55/45, exclusive of the catalyst and the binder level was 1% by weight, based on sand ("BOS").

Once mixed, the resulting foundry mix was compacted into a dogbone-shaped corebox, with the resulting test specimens ("dogbones") being tested for tensile strength at one hour, two hours and at three hours after removal from the corebox. Work times and strip times were also conducted on the test specimens.

Using the same protocol, the test was repeated with 2-ethanolpyridine ("2-EP") (CAS 103-74-2), 3-chloropyridine ("3-CP") (CAS 626-60-8) and 2-methoxypyridine ("2-MOP") (CAS 1628-89-3) instead of 4-PPP. In each case, a 20% solution of the selected catalyst in AROMATIC 150, an aromatic hydrocarbon liquid commercially available from ExxonMobil Chemical Company, was used. The catalyst addition amount was based on Part I ("BOP1"). Tensile strength targets were for a minimum of 50 psi at 1 hr, 100 psi at 2 hrs, 130 psi at 3 hrs and 250 psi at 24 hrs with a strip time of at least 45 to 60 minutes. Results were as follows:

| Catalyst % (BOP1) | Catalyst | WT (min) | ST (min) | Tensile Strength (psi) | | | |
|---|---|---|---|---|---|---|---|
| | | | | 1 h | 2 h | 3 h | 24 h |
| 5.0 | 3% 4-PPP | 16.00 | 21.00 | 99 | 148 | 165 | 263 |
| 2.5 | 3% 4-PPP | 58.00 | 68.00 | 23 | — | 61 | 234 |
| 5.0 | 1.5% 4-PPP | 83.00 | 124.00 | 9 | — | — | — |
| 5.0 | 20% 2-MOP | 84.75 | 101.75 | 52 | 111 | 139 | 261 |
| 7.0 | 20% 3-CP | 60.50 | 69.00 | 63 | — | 166 | 246 |
| 5.0 | 20% 2-EP | 43.25 | 54.25 | 86 | 138 | 168 | 252 |

What is claimed is:

1. A binder composition for a foundry mix, comprising:
   a polyurethane binder precursor, provided in two parts, the first part comprising a polyol component and the second part comprising a polyisocyanate component; and
   a liquid curing catalyst that is 2-ethanolpyridine, the liquid curing catalyst being present in the range of about 5 to 7 weight percent based on the weight of the first part of the polyurethane binder component, selected to provide a work time in the range of about 45 minutes to about 60 minutes after being mixed with the polyurethane binder precursors and an appropriate foundry aggregate and a strip time that is less than 167% of the work time, as measured from the same starting point.

2. The binder composition of claim 1, wherein:
   the liquid curing catalyst is kept separate from at least the second part of the polyurethane binder precursor until use.

3. The binder composition of claim 1, wherein:
the liquid curing catalyst further comprises an aromatic hydrocarbon liquid in which the 2-ethanolpyridine is soluble.

4. The binder composition of claim 3, wherein:
the liquid curing catalyst is present in the aromatic hydrocarbon liquid in an amount of about 20 weight percent.

5. A foundry mix, comprising:
a polyurethane binder precursor, provided in two parts, the first part comprising a polyol component and the second part comprising a polyisocyanate component;
a liquid curing catalyst that is 2-ethanolpyridine present in the range of about 5 to 7 weight percent based on the weight of the first part of the polyurethane binder component; and
an appropriate foundry aggregate.

6. The foundry mix of claim 5, wherein:
upon mixing the two parts of the polyurethane binder precursor, the liquid curing catalyst and the foundry aggregate, the resulting foundry mix having curing properties characterized by:
a work time in the range of about 45 minutes to about 60 minutes for forming a foundry shape in a pattern; and
a strip time for removing the formed and cured foundry shape from the pattern, such that a ratio of the work time to the strip time is in the range of about 0.6 to 1.0.

7. The foundry mix of claim 5, wherein:
the liquid curing catalyst is kept separate from at least the second part of the polyurethane binder precursor until use.

8. A "no-bake" process for forming a foundry shape, comprising the steps of:
activating a curing property of a foundry mix according to claim 5 by mixing the two parts of the polyurethane binder precursor with the liquid curing catalyst and the foundry aggregate;
working the activated foundry mix in a pattern to form a foundry shape, the curing rate of the foundry mix allowing the activated foundry mix to be worked for a time of about 45 minutes to about 60 minutes after the activating step; and
stripping the formed foundry shape from the pattern once the formed foundry shape is sufficiently cured to be handleable, the curing rate being sufficient to allow the stripping to occur at a strip time, measured from the activating step, that is less than about 167% of the work time.

\* \* \* \* \*